United States Patent Office 3,149,719
Patented Sept. 22, 1964

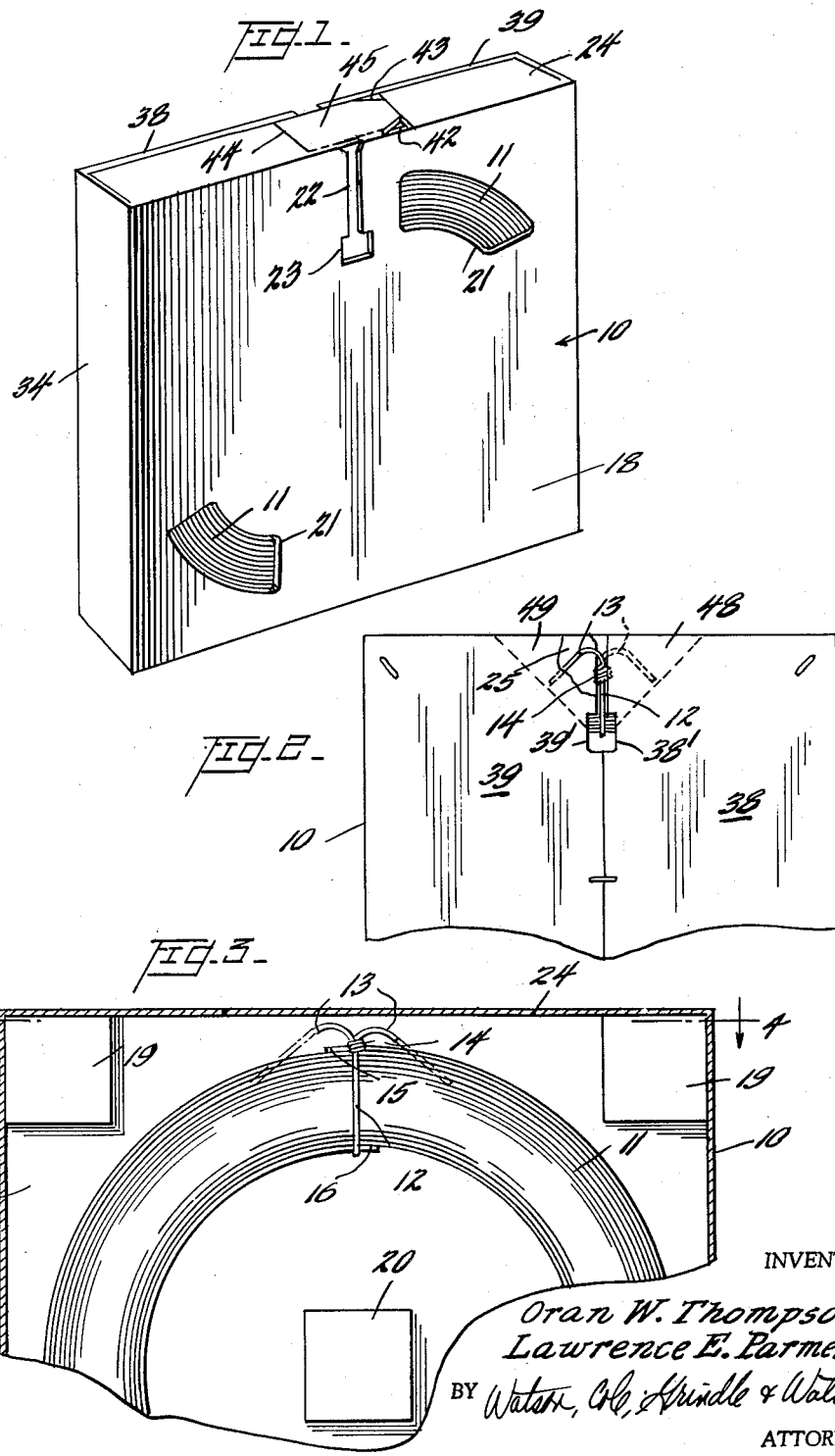

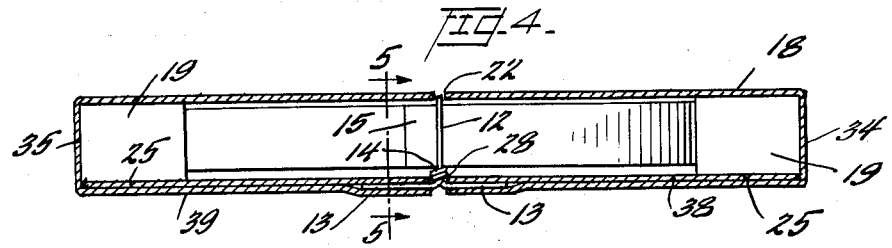
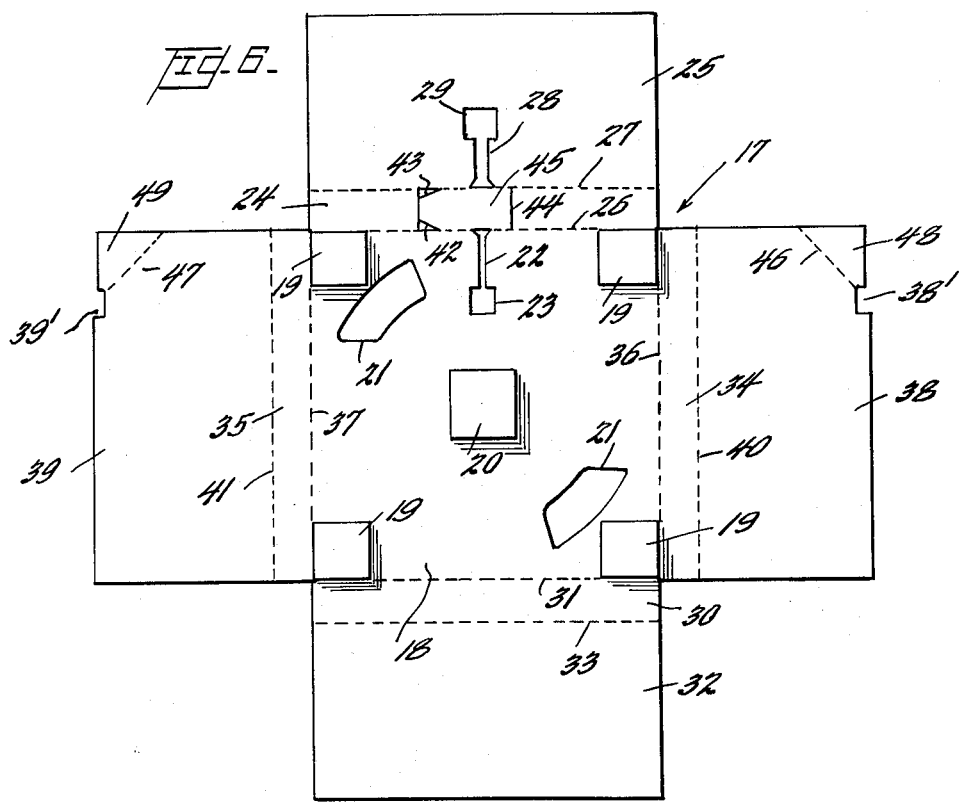
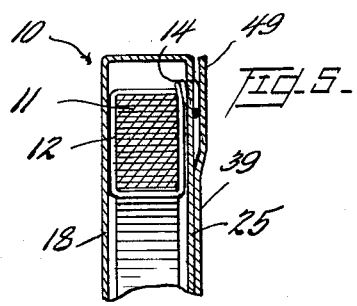

3,149,719
BAND SAW PACKAGES
Oran W. Thompson, Mount Clemens, and Lawrence E. Parmenter, Plymouth, Mich., assignors to Nicholson File Company, Providence, R.I., a corporation of Rhode Island
Filed May 5, 1964, Ser. No. 365,045
3 Claims. (Cl. 206—52)

This invention relates to shipping containers for coiled articles of manufacture, and more particularly for "hard back" band saw material. This material is customarily packaged in specified lengths, say 100 feet, in coiled form, and because it is made of steel having high resilience it has a tendency to uncoil, thus exerting considerable pressure against the sides of the container in which it is packaged. For this reason it is necessary to bind the coil tightly together with wire or other filamentary means to prevent its expansion, as otherwise the material would be very difficult to remove from the container when it is desired to do so.

It is also desirable to prevent rotation of the coil after it is placed in the container, so that the end of the material will remain in a freely accessible location within the container in order that the material may be readily dispensed from the container after the wire binding the coil together is removed. For this reason it is desirable to provide means for securing the ends of the wire or other filamentary material to the container in a definite location, whereby the wire and the coil of material which it binds are prevented from shifting rotatively during shipment or other handling of the container.

It is therefore the general object of the present invention to provide a band saw package comprising a closed carton and a coil of band saw within the carton in a position to be dispensed from said carton as required, the coil of band saw material being encircled and bound together by wire or other filamentary means, provision being made for fixing the ends of the wire relative to the carton so as to prevent rotation of the coil during shipment or handling.

A further object is the provision of a package as described above, the ends of the wire or other filamentary means being fixed relative to the carton in such a way that they are covered by portions of the carton and do not protrude therefrom, those portions of the carton covering the said wire ends being readily liftable or removable thus exposing the said ends when it is desired to remove the wire.

Another object is the provision of a package such as described, provided with slots in the front and the back of the carton adjacent the location of the said wire, facilitating removal of the wire when it is desired to dispense the band saw material from the carton.

Another object is the provision of such a package including a readily liftable or removable tab in the top wall of the carton for exposing an end of the band saw material, thus permitting it to be readily dispensed from the carton in any desired length. The aforesaid liftable or removable portions of the carton, and the slots as described, also permit the coil to be readily rewired, if necessary or desirable. The slots are preferably formed with enlarged openings at their inner or lower ends to facilitate removal and replacement of the wire or other filamentary means.

A further object is the provision of a novel blank of container material, suitable for folding about a coil of band saw material in the assembly of a package such as described above.

Other and further objects, features and advantages will be apparent from the description which follows, read in conjunction with the accompanying drawings, in which:

FIGURE 1 is a perspective view of a package of band saw material according to the invention;
FIGURE 2 is a fragmentary elevation of the container with a part broken away to expose the arrangement of the wire or other filamentary means used to bind the coil of band saw material;
FIGURE 3 is a vertical longitudinal section through that portion of the package illustrated in FIGURE 2;
FIGURE 4 is a horizontal section on line 4—4 of FIGURE 3;
FIGURE 5 is a fragmentary vertical section on line 5—5 of FIGURE 4; and
FIGURE 6 is a plan view of a blank suitable for folding about a coil of band saw material in assembling the package illustrated in FIGURES 1-5.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The package of the present invention comprises a carton or container 10 enclosing a coil 11 of band saw material which is encircled and bound together by means of a wire 12, the ends 13 of which are twisted together as at 14. The outside coil end 15 of the band saw is positioned approximately one inch adjacent the wire 12, whereby the latter, when tightly twisted about the coil 11, effectively prevents expansion or uncoiling of the latter. The ends 13 of wire 12 are fixed relative to the container in a manner to be described.

The carton or container itself may be best described by reference to FIGURE 6 illustrating the blank 17 which, when suitably folded, comprises the container. The blank 17 is preferably generally cruciform in outline and includes a square central portion 18 which forms the front wall of the container to which are preferably adhesively attached wooden blocks 19 at its respective corners and a further block 20 at its center, which serve to strengthen the box and prevent the center section of the box from collapsing on the band saw coil when stacking and shipping this container. The front wall 18 is also preferably provided with sight openings 21 at suitable locations for viewing the coil 11 to determine the quantity remaining in the package, and also to be used as rewind openings for rewinding the exposed end of the coil back into the box. Front wall 18 is also formed to provide a slot 22 extending from the top of the front wall downwardly toward its center to a substantial distance, an enlarged opening portion 23 being formed at the lower end of the slot 22. The slot 22 and opening 23 extend entirely through the front wall 18.

A top wall portion 24 is integral with the front wall 18 and is provided with an extension 25 joining its outer edge, the junction between the parts 18 and 24 being defined by a score line 26, and the junction between the parts 24 and 25 being defined by a score line 27, to facilitate folding. The extension 25 of the top wall 24 is formed to provide a slot 28 having an enlarged opening portion 29 similar to the slot 22 and opening 23 in the front wall.

A bottom wall portion 30 is connected to the front wall 18 at a score line 31, and an extension 32 is connected to the bottom wall 30 at a score line 33. End walls 34 and 35 are connected to the side edges of the front wall 18 at score lines 36 and 37, respectively, and are provided with extensions 38 and 39 connected to the respective end walls 34 and 35 at score lines 40 and 41. Extensions 38 and 39 are so dimensioned as together to constitute a back wall of the same size and shape as the front wall 18, and their meeting edges are notched or profiled as at 38', 39' so that the back wall formed by the extensions 38 and 39 when folded will form a slot and enlarged opening registering exactly with slot 28 and opening 29 of top extension 25 and in line with slot 22 and opening 23 of front wall 18.

The top wall 24 is notched as at 42 and 43 and transversely cut as at 44 and perforated between line 44 and notched openings 42 and 43, and is also cut between notched openings 42 and 43 to provide a liftable tab 45 for a purpose to be described. The extensions 38 and 39 are scored as at 46 and 47 to provide liftable tabs 48 and 49.

In assembling the package illustrated in FIGURE 1 using the blank of FIGURE 6, the coil 11 of band saw material is centered around the block 20 and between the blocks 19, the coil 11 first being bound as seen in FIGURE 3, with a length of wire 12. The top wall 24 and extension 25 are then folded rearwardly and downwardly to cover the upper portion of the coil 11, the wire ends 13 being passed through the slot 28 as this is done, so as to extend outwardly of the extension 25 after the latter is folded over the coil 11. Next, the bottom wall 30 and extension 32 are folded rearwardly and upwardly to cover the lower portion of the coil 11. The wire ends 13 are then disposed in the positions illustrated in FIGURE 3 after which the end walls 34 and 35 and extensions 38 and 39 are folded rearwardly and inwardly to cover the extensions 25 and 32 and are secured thereto by adhesive, staples, or other satisfactory means, thus securely closing the container. As will be understood, the wire ends 13 are covered by the tab portions 48 and 49 of the end wall extensions 38 and 39 and are thus protected during shipment or handling of the package, as well as protecting the handlers from inadvertent injury by the wire ends 13. At the same time, since the ends 13 are gripped between the extension 25 and the extensions 38 and 39, respectively, the wire 12 is securely fixed relative to the container, thus preventing rotation of the coil 11 within the container.

When it is desired to dispense the band saw material, the top tab 45 is lifted after breaking the material along the score lines 26, 27 and 44 outlining the tab 45, when the latter may be lifted by hinging it around the short segment of material remaining between the notches 42 and 43. The end 15 of the band saw is thus exposed. The tabs 48 and 49 are then lifted, hinging them about the score lines 46 and 47, respectively, thus exposing the ends 13 of the wire 12. The wire ends are then rotated to untwist the wire, after which the latter may be removed by reason of the slots 22, 28 and the enlarged openings 23, 29.

If desired, the tabs 45, 48 and 49 may be removed entirely. In any case, after the wire 12 is removed from the coil 11 and the top tab 45 is lifted or removed, the end 15 of the band saw may be grasped and the material may easily be pulled from the container through the opening formed by the lifting of the tab 45 until the desired length of material is outside the container, the coil rotating as the material is pulled outwardly.

When the desired length of material has been severed from the coil 11, the latter may be rewired and/or recoiled if desired.

It will be appreciated that the several score lines mentioned above may be partially slit, or perforated, or suitably weakened in any well known manner. Any suitable material, such as corrugated paperboard or the like, may be used for fabricating the blank 17.

Having thus described the invention, what is claimed as new and desired to be secured by Letters Patent is:

1. A band saw package comprising a closed carton and a coil of band saw within said carton to be dispensed from said carton as required, said carton comprising integral front, back, top, bottom and opposite end wall portions and extensions attached to said top and bottom wall portions, the back wall comprising extensions attached to said respective end wall portions and folded over said first mentioned extensions, said first mentioned extensions being folded toward each other from said top and bottom walls respectively, said front and back walls being formed to provide opposed slots extending downwardly from points located approximately midway of the length of said top wall to points lying substantially inwardly of the upper edges of said front and back walls, said top wall being formed to provide a liftable top tab temporarily closing the upper ends of said slots, said back wall being formed to provide two liftable back tabs adjacent the respective edges of the said slot in said back wall, filamentary means encircling the said coil adjacent the said slots, the respective ends of said filamentary means being disposed beneath said respective back tabs and over said first mentioned extension attached to said top wall, said filamentary means restraining said coil from rotating and uncoiling, and means securing the extensions forming said back wall to said first mentioned extensions for maintaining the carton in closed condition and temporarily preventing access to the ends of said filamentary means.

2. A band saw package according to claim 1, said slots being enlarged at their lower ends and said liftable back tabs extending downwardly to the enlarged portion of said slot in said back wall.

3. A unitary carton blank formed from suitable sheet material and comprising a rectangular central portion having upper, lower and side edges, and further generally rectangular portions integral with and extending outwardly from each of said edges of said central portion and joined with said edges along score lines, each said further portion comprising a relatively narrow strip adjacent one of said edges and adapted to constitute one of the top, bottom and two end walls of the carton, each said further portion also comprising an extension joined to said last mentioned wall portion along a score line and adapted to be folded along said last mentioned score line to lie parallel to and spaced from said central portion, said central portion being formed to provide a slot extending downwardly from its upper edge to a substantial distance, said extension joined to said top wall strip being formed to provide a corresponding slot extending upwardly from the score line joining said last mentioned extension to said top wall strip, said latter strip having a transverse score line extending between the score lines joining it to said central portion and to said last mentioned extension to define with said last mentioned score lines a liftable tab portion intermediate the length of said top wall strip and connecting the adjacent ends of said slots, each of said extensions joined to said end wall strips having a diagonal score line extending across its upper outer corner to define a liftable tab adapted to cover a portion of said top wall extension adjacent said slot therein when said end wall extensions are folded over said top wall extension after the top and bottom wall extensions are folded to lie parallel to said central portion.

References Cited in the file of this patent
UNITED STATES PATENTS

| 1,933,661 | Dale | Nov. 7, 1933 |
| 1,947,351 | Macklanburg | Feb. 13, 1934 |
| 2,796,170 | Davis | June 18, 1957 |
| 3,115,242 | Kolesh | Dec. 24, 1963 |